United States Patent [19]

Otani et al.

[11] Patent Number: 5,293,798
[45] Date of Patent: Mar. 15, 1994

[54] SAWING MACHINE

[75] Inventors: Kazuhiro Otani, Matsubara; Osamu Iguchi, Suminoe; Junji Tsuji, Sakai; Tetsuo Hiraga, Matsubara; Tadao Tanisaka, Osaka; Tetsuji Bai, Izumi, all of Japan

[73] Assignee: Taihei Machinery Works, Inc., Komaki, Japan

[21] Appl. No.: 80,096

[22] Filed: Jun. 23, 1993

Related U.S. Application Data

[63] Continuation of Ser. No. 852,344, Mar. 17, 1992, abandoned, which is a continuation of Ser. No. 490,703, Mar. 7, 1990, abandoned.

[30] Foreign Application Priority Data

Mar. 7, 1989 [JP] Japan .................................. 1-55397

[51] Int. Cl.⁵ .............................................. B27B 5/34
[52] U.S. Cl. ........................................ 83/504; 83/508.3; 83/665; 83/676; 83/700
[58] Field of Search ................. 83/665, 666, 675, 676, 83/698, 700, 508.3, 498, 504; 403/356, 358

[56] References Cited

U.S. PATENT DOCUMENTS

| | | | |
|---|---|---|---|
| 2,239,623 | 4/1941 | Oster | 83/665 |
| 2,491,976 | 12/1949 | Hauser | 83/665 |
| 3,202,189 | 8/1965 | Pearson | 83/169 |
| 3,285,302 | 11/1966 | Thrasher | 83/508.3 |
| 3,487,903 | 1/1970 | Stickan | 403/356 |
| 3,837,265 | 9/1974 | Tokuno | 83/665 |
| 4,220,064 | 9/1980 | Potter | 83/700 |
| 4,285,684 | 8/1981 | Smith | 493/355 |
| 4,414,875 | 11/1983 | Pearson | 83/508.3 |

Primary Examiner—Hien H. Phan
Attorney, Agent, or Firm—Wenderoth Lind & Ponack

[57] ABSTRACT

A sawing machine having a spindle and circular saws thereon adapted to rotate with and axially slidably mounted on the spindle. A movable joint member or a one-way clutch is provided between the spindle and the saws. While the spindle is rotating at a low speed or is at a stop, the joint member or the clutch is in its inoperative position, keeping the saws disengaged from the spindle so that the distances between the adjacent saws can be adjusted freely. When the spindle begins to rotate at a high speed, the joint member is moved outwardly or the clutch is engaged by centrifugal force, thus locking the circular saws to the spindle.

6 Claims, 6 Drawing Sheets

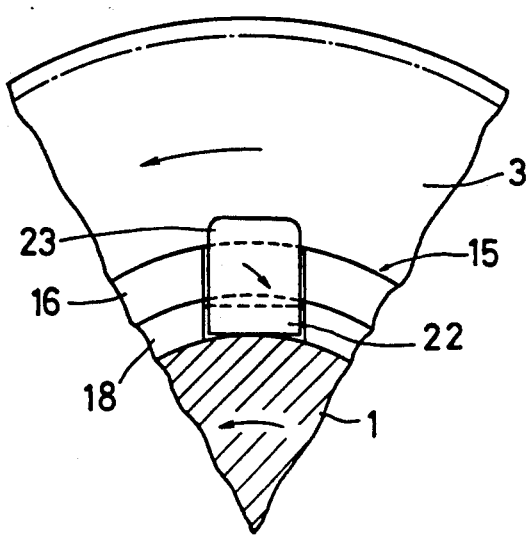
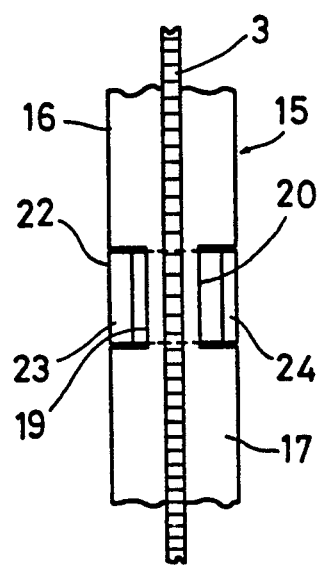
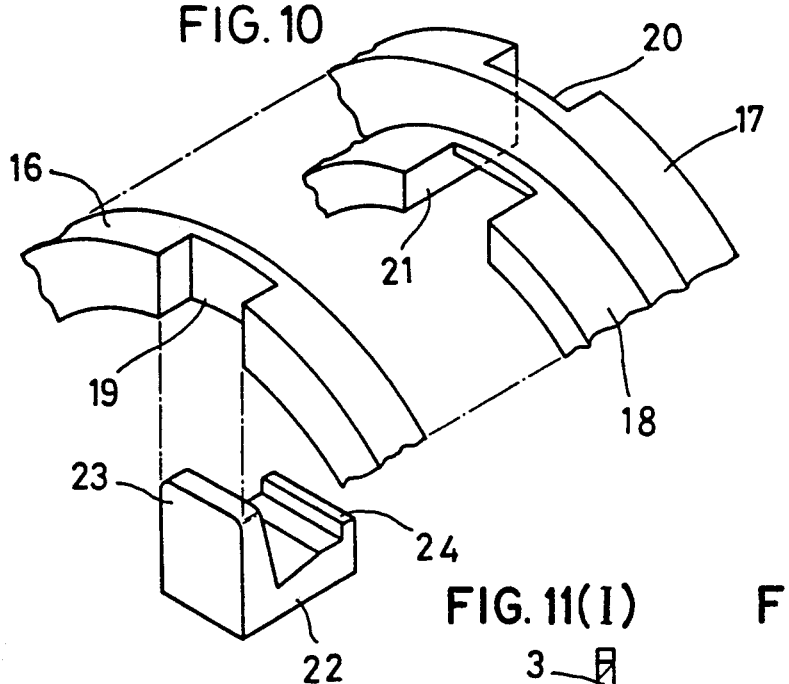
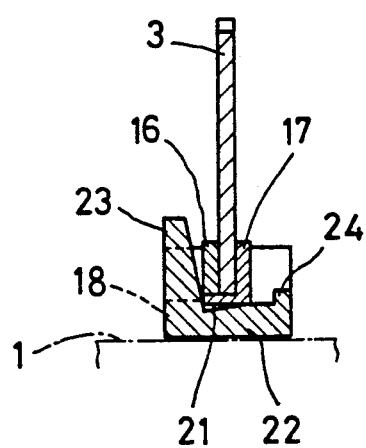
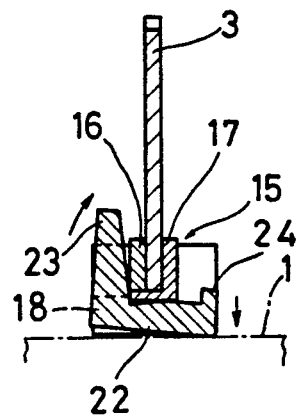

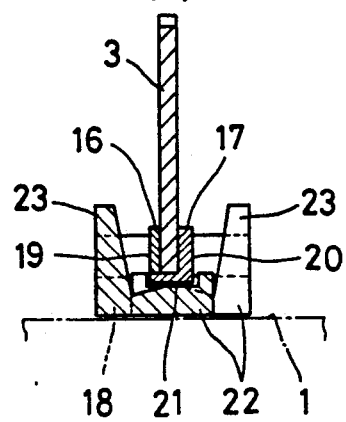
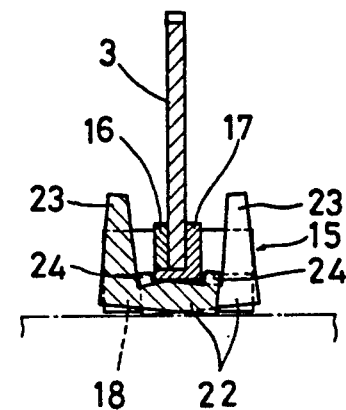
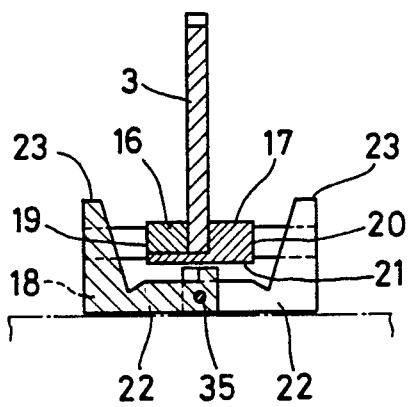
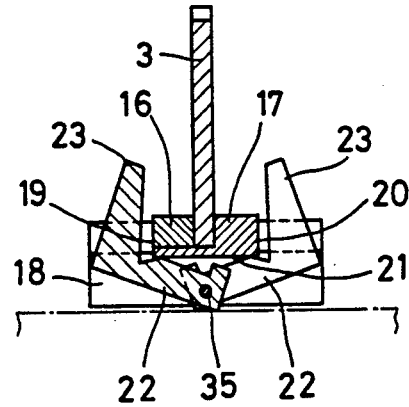
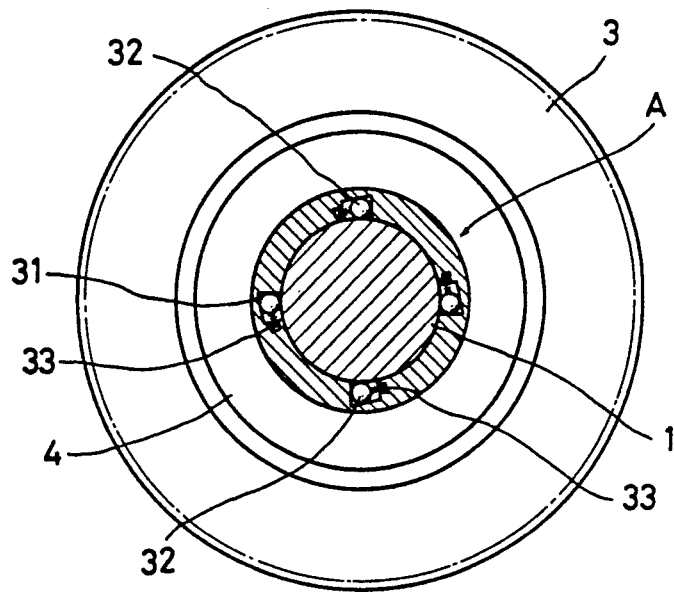
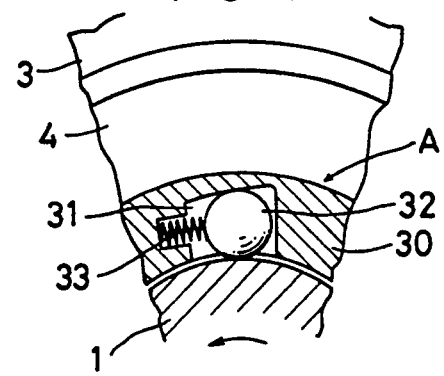

SAWING MACHINE

This application is a continuation of now abandoned application, Ser. No. 07/852,344, filed Mar. 17, 1992 which is a continuation of Ser. No. 07/490,703 filed Mar. 7, 1990 now abandoned.

The present invention relates to a sawing machine having a plurality of saws to cut a material into a plurality of parts.

A prior art sawing machine has a plurality of circular saws fitted on a spindle with cylindrical positioning spacers therebetween. The circular saws are fixed in position by tightening nuts.

With the above-described prior art sawing machine, in order to change the widths of the material being cut, it was necessary to stop the machine and loosen the nuts to dismount the spacers and the circular saws from the spindle.

Spacers for cutting a material to desired widths were then selected, the circular saws fitted on the spindle together with the spacers, and finally they were tightened by nuts. Such work is not only extremely troublesome but also lowers the production rate because of the long downtime of the machine for changing spacers.

Also, such a prior art machine required many spacers having different sizes and thus selection of desired spacers and their maintenance were troublesome.

It is an object of this invention to provide a sawing machine which obviates the above said shortcomings and which permits easy and quick adjustment of the distances between the circular saws.

To change the widths being cut, each circular saw is moved along the spindle with the spindle in rotation or at a stop until a desired spacing is attained.

After moving each circular saw to a desired position, the spindle is driven at a high speed by a motor. This will rotate the circular saws at a high speed together with the spindle. At the same time, the movable joint member which is rotating together with them will move outwardly by centrifugal force, locking the spindle and the circular saws together.

The structure is such that by rotating the spindle at a high speed together with the circular saws after adjusting the distances between the adjacent circular saws, the movable joint member will take a position to couple the circular saws and the spindle together.

The structure is such that when the spindle begins to rotate at a high speed after adjusting the position of the circular saws, a portion of the pivotable movable member will be pressed against the spindle, thus coupling the spindle and the circular saws together.

The structure is such that each circular saw is positioned while the spindle is at a stop and the one-way clutch is loose. Then the spindle is driven to lock the circular saws to the spindle by means of the one-way clutch. Thus the spindle and the circular saws rotate in unison.

With the structure of the invention, when the spindle is rotated at a high speed after adjusting the position of the circular saws, the movable joint members will move radially while rotating together with the spindle so as to be pressed against the circular saws. Thus the circular saws and the spindle are coupled together.

With the structure of the invention, when the spindle is rotated at a high speed after adjusting the position of the circular saws, the movable joint members will protrude into the hollow annular bodies thus increasing a fluid pressure therein.

Owing to this fluid pressure, the inner peripheral wall will be deformed elastically, thus coupling the annular saws and the spindle together.

According to the present invention, since a plurality of circular saws adapted to rotate together with the spindle is axially slidable with respect to the spindle, the distances between the adjacent circular saws can be adjusted very easily.

Also, by the provision of the movable joint member mounted between the spindle and the circular saws and adapted to be actuated by centrifugal force to join the spindle and the circular saws together, they can be joined together automatically by turning the spindle after adjusting the distances between the adjacent circular saws. This eliminates the necessity of fixing the circular saws to the spindle and thus greatly improves the efficiency of cutting of the material.

With the structure having a one-way clutch, the distances between the circular saws can be freely adjusted while the spindle is at rest because the clutch is loose. When the spindle starts rotating, the one-way clutch is coupled, coupling the circular saws to the spindle. Thus the same effect as with the structure having a movable joint member is obtained.

Further, with the structure having a liquid-filled hollow annular member provided on the inner peripheral surface of the circular saws and a movable joint member mounted on the inner peripheral surface of the hollow annular member so that the movable joint member will be pressed against the spindle when the fluid pressure in the hollow annular member rises at its outer peripheral portion owing to the rotation of the circular saws, thus coupling the circular saws and the spindle together, the movable joint member is actuated by the rise in fluid pressure owing to a centrifugal force. Thus the coupling and uncoupling between the spindle and the circular saws are very smooth.

Other features and objects of the present invention will become apparent from the following description taken with reference to the accompanying drawings, in which.

Figure 6:
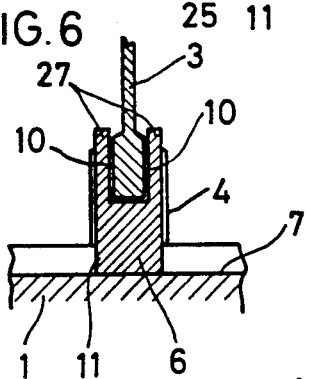
Figure 5:
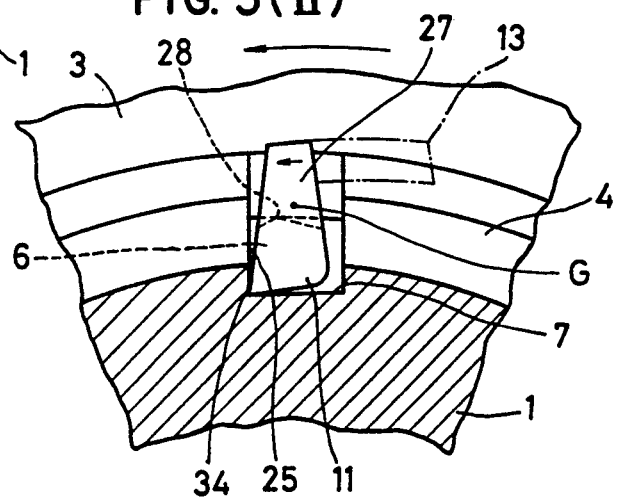
Figure 7I:
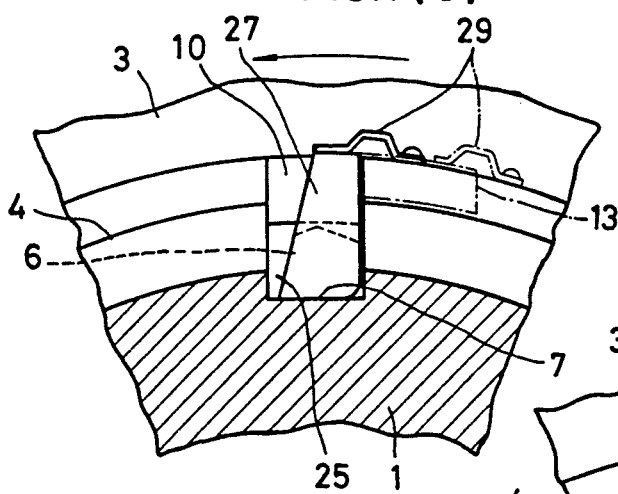
Figure 7:
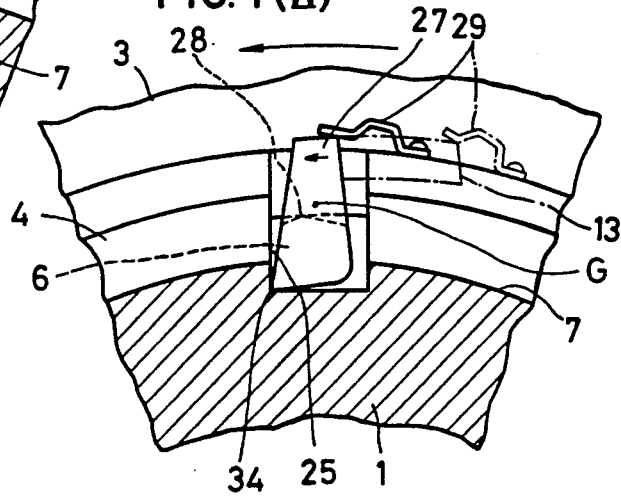
Figure 16:
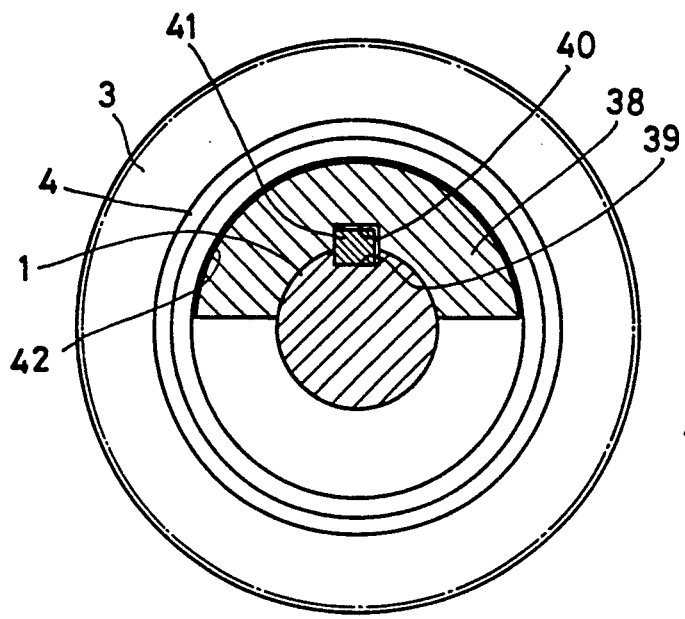
Figure 17:
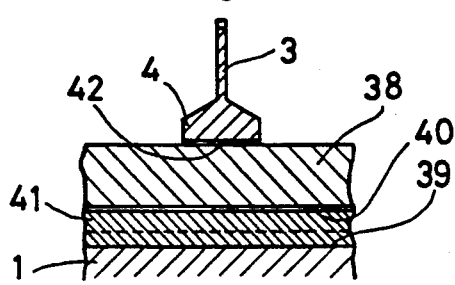
Figure 18:
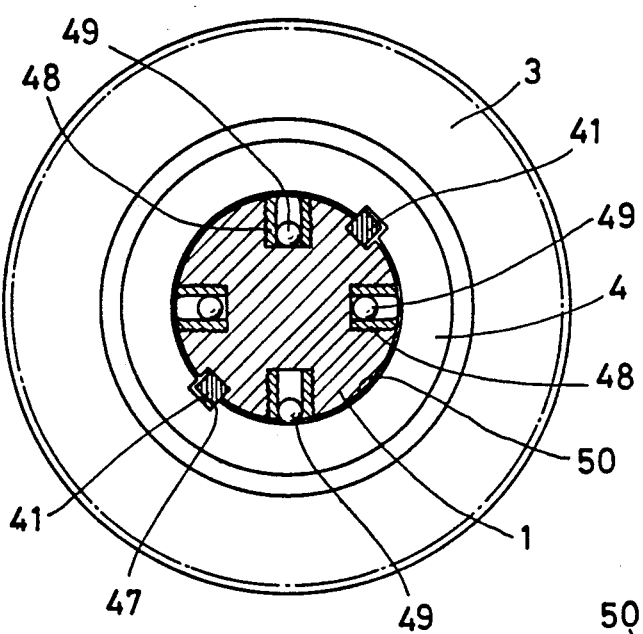
Figure 19:
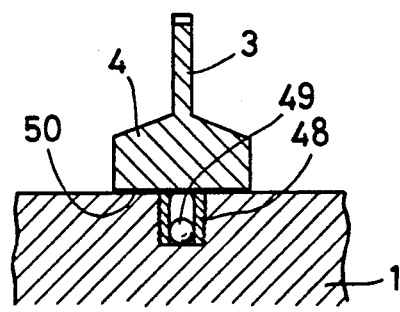
Figure 20:
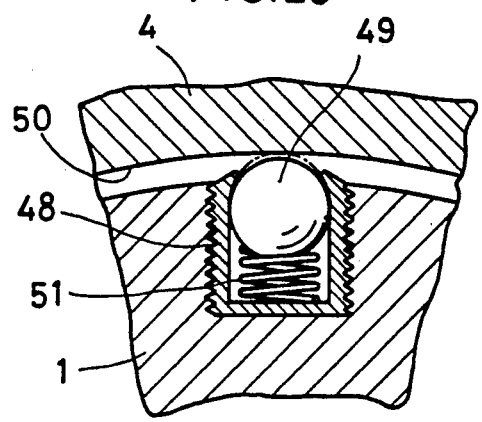
Figure 21:
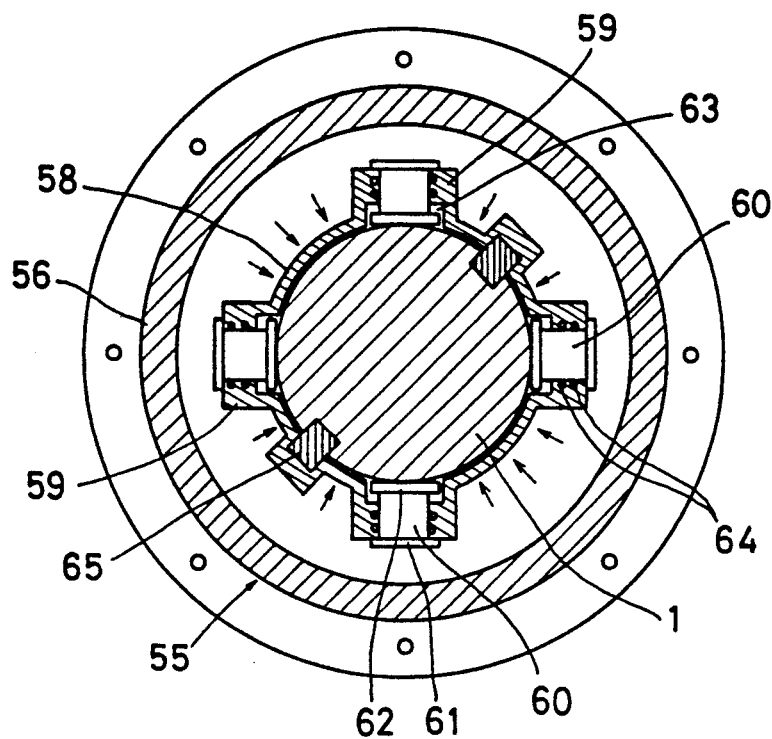

FIGS. 5-I and 5-II are partially cutaway transverse sectional views of a third embodiment showing its different conditions;

FIG. 6 is a partially cutaway cross-sectional longitudinal view of the same;

FIGS. 7-I and 7-II are partially cutaway transverse sectional views of the fourth embodiment showing its different conditions;

FIG. 8 is a similar view of the fifth embodiment;

FIG. 9 is a partially cutaway top plan view of the same;

FIG. 10 is an exploded perspective view of a portion of the same;

FIGS. 11-I and 11-II are enlarged longitudinal sectional views of portions of the same showing how it operates;

FIGS. 12-I and 12-II are partially cutaway longitudinal sectional front views of the sixth embodiment showing its different conditions;

FIGS. 13-I and 13-II are similar views of the seventh embodiment showing its different conditions;

FIG. 14 is a partially transverse sectional view of the eighth embodiment;

FIG. 15 is an enlarged partially cutaway vertical sectional view of a portion of the same;

FIG. 16 is a transverse sectional view of the ninth embodiment;

FIG. 17 is a partially cutaway longitudinal sectional front view of the same;

FIG. 18 is a longitudinal sectional side view of the tenth embodiment;

FIG. 19 is a partially cutaway longitudinal sectional front view of the same;

FIG. 20 is a longitudinal sectional side view of the eleventh embodiment;

FIG. 21 is a transverse sectional side view of the twelfth embodiment; and

Figure 22:
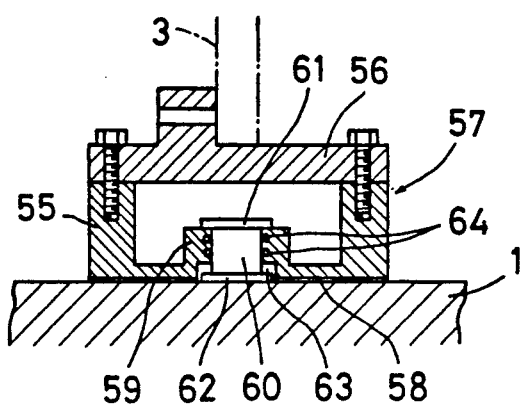

FIG. 22 is an enlarged longitudinal sectional front view of a portion of the same.

Figure 1:
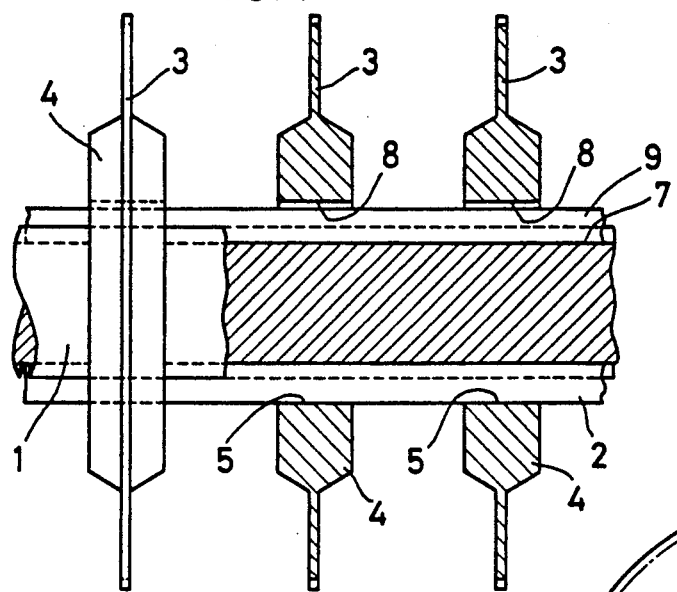
FIG. 1 is a longitudinal view, partially in section, of the first embodiment of the present invention.
Figure 2:
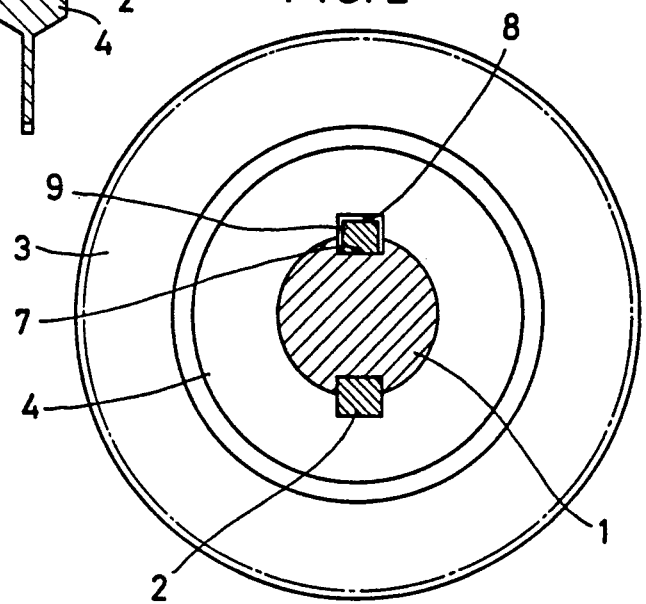
FIG. 2 is a transverse sectional view of a portion of the same.
Figure 3:
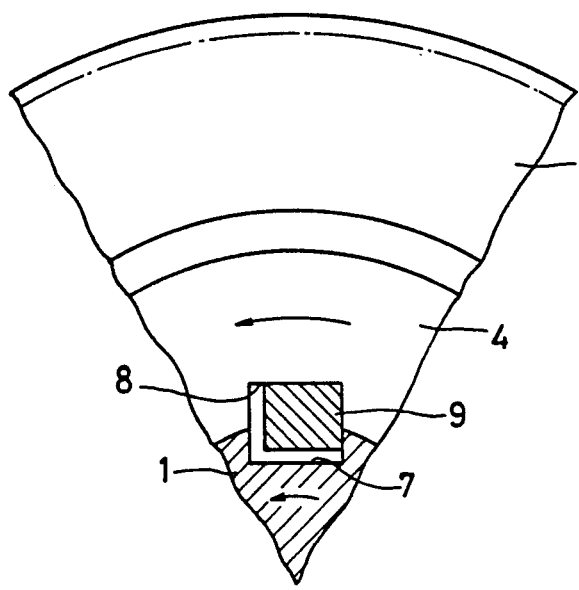
FIG. 3 is an enlarged partially cutaway transverse sectional vi of a portion of the same.

In the first embodiment shown in FIGS. 1 to 3, numeral 1 designates a spindle of a sawing machine (not shown). A key 2 is fixedly mounted on the outer periphery thereof.

Numeral 3 designates a plurality of circular saws having their middle portion thickened to form a boss 4. The key 2 is engaged in a key groove 5 formed in the inner periphery of the boss 4 so that the circular saws 3 will rotate together with the spindle 1 and be axially slidable.

The spindle 1 is provided with another groove 7 while the boss 4 is provided in its inner periphery with a groove 8 opposite to the groove 7.

In FIGS. 1 to 3, numeral 9 designates a movable joint member in the form of a square pole. It is inserted into the space defined by the grooves 7 and 8 with a suitable clearance.

While the spindle 1 is rotating at a low speed or is at a stop, the movable joint member 9 is received loosely in the grooves 7 and 8.

With this arrangement, each circular saw 3 can freely move along the key 2. Thus the distance between any adjacent circular saws 3 can be changed easily.

After adjusting the distances between the adjacent circular saws 3, when the spindle 1 is rotated in the direction of arrow in FIG. 3, the movable joint member 9 held between the grooves 7 and 8 will be moved outwardly by centrifugal force, and pressed against the bottom of the groove 8. Thus the spindle 1 and the circular saws 3 are coupled together.

Although in the above embodiment, the key 2 is used, it may be omitted, because the circular saws 3 and the spindle 1 can be rotated together with each other by use of only the movable joint member 9.

Figure 4:
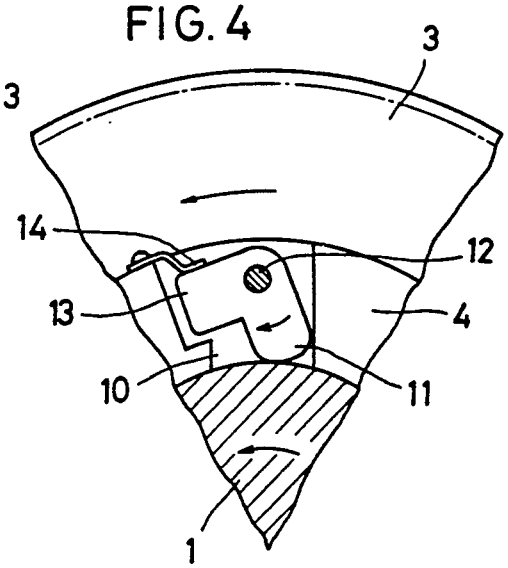
FIG. 4 is a partially cutaway transverse sectional view of the second embodiment.
Figure 5I:
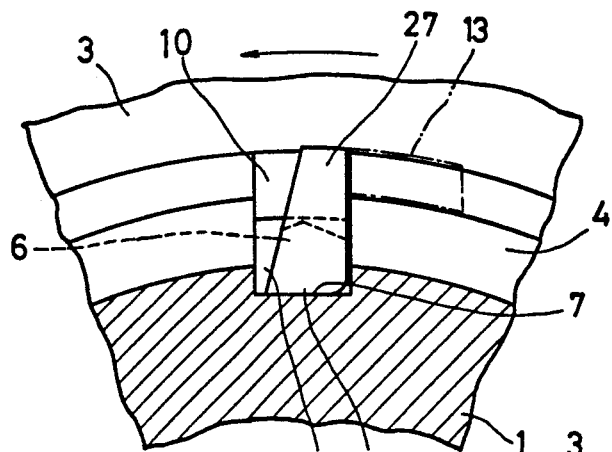

In the second embodiment shown in FIG. 4, the boss 4 of each circular saw 3 is provided in one side thereof with a recess 10 in which a cam-shaped movable joint member 11 is received so as to be pivotable about a pin 12.

In this embodiment, in order that a turning torque acts on the members 11 when they are subjected to a centrifugal force, a weight 13 is provided at one side of each member 11 and further a spring 14 for biasing the weight 13 radially inwardly is provided. With this arrangement, while the spindle 1 is rotating at a low speed or is at a stop, the members 11 are kept apart from the outer periphery of the spindle 1.

In this embodiment, the distances between the circular saws 3 can be freely changed while the spindle 1 is rotating at a low speed or is at a stop.

After adjusting the distances between the circular saws 3, by turning the spindle 1 in the direction of arrow in FIG. 4, the members 11 will pivot in the direction of arrow against the biasing force of the springs 14 under the centrifugal force acting on the weights 13. Thus the spindle 1 and the circular saws 3 are coupled together so as to rotate together.

FIGS. 5-I, 5-II and 6 show the third embodiment.

This embodiment is the same as the second embodiment in that a movable joint member 11 is received in a recess 10 formed in the side face of the boss 4 of each circular saw 3. But in this embodiment shown in FIG. 3, no pin is used.

Namely, in this embodiment, recesses 10 are formed in the boss 4 of each circular saw 3 at both sides thereof. Each boss 4 has its inner periphery recessed to form a housing portion 25 at a portion where the recesses 10 are formed.

Each member 11 has a thick-walled portion 6 and pieces 27 at both sides thereof so that it has a U-shaped section. It is mounted on the spindle 1 with its thick-walled portion 6 received in the housing portion 25 and the pieces 27 received in the recesses 10 at both sides of the portion 25.

A protrusion 28 is provided on the radially outer portion of the thick-walled portion 6. Also, by providing a weight 13 on pieces 27 as shown by chain line, the certrifugal force can be increased. But this weight 13 may be omitted.

Supposing that the members 11 have their center of gravity at point G shown in FIG. 5-II, when they are rotated at a high speed together with the spindle 1, they will pivot about their respective corners 34 in the direction of arrow in FIG. 5-II by the action of a centrifugal force so that their outer protrusions 28 are pressed against the inner surface of the housing portions 25. Thus the spindle 1 and the circular saws 3 are coupled together.

While the spindle 1 is rotating at a low speed or is at a stop, no centrifugal force acts on the members 11.

Thus, the outer protrusions 28 on the thick-walled portions 6 are kept apart from the inner surface of the housing portions 25, so that the position of the circular saws 3 can be changed freely.

FIGS. 7-I and 7-II show the fourth embodiment in which springs 29 are provided in contact with the pieces 27. In this embodiment, while the spindle 1 is at a stop, the movable joint members 11 have their bottom surface in contact with the outer peripheral surface of the spindle 1 owing to its own weight. Thus the movement of the circular saws 3 gets heavy.

While the spindle 1 is rotating at a low speed, the outer protrusion 28 on the thick-walled portion 6 of each member 11 will come into contact with the inner surface of the housing portions 25 due to a small centrifugal force. Thus the circular saws 3 will get heavy. But in this embodiment, the springs 29 serve to lower the centrifugal force so as to keep the protrusions 28 afloat along the inner surface of the housing portions 25. Thus the circular saws 3 can be moved easily.

Otherwise, this embodiment is the same as the third embodiment shown in FIGS. 5 and 6.

Also, in this state, since the centers of gravity of the members 11 remain at G in FIG. 7-II, when the spindle rotates at a high speed, the centrifugal force acting on the members 11 will overcome the biasing force of the springs 29, pivoting the members 11 about their respective corners 34 in the direction of arrow in FIG. 7-II. Thus the outer protrusions 28 are pressed against the inner surface of the housing portions 25, so that the spindle 1 and the circular saws 3 are coupled together.

FIGS. 8 to 11 show the fifth embodiment.

In this embodiment, as shown in FIG. 10, each boss 15 comprises right and left ring-shaped members 16 and 17. A circular saw 3 is sandwiched between the members 16 and 17 so that a cylindrical portion 18 formed on one side of the inner peripheral surface of the member 17 is inserted in a center bore formed in the circular saw 3 and in the ring-shaped member 16 as shown in FIGS. 11-I and 11-II. The cylindrical portion 18 is then secured to the circular saw 3 by bolts or rivets.

The members 16 and 17 are provided in their respective outer surfaces with recesses 19 and 20 whereas the cylindrical portion 18 is provided in its inner periphery with an axial groove 21 so as to correspond in relative position to the recesses 19 and 20. Numeral 22 designates a movable joint member provided at one end thereof with a weight 23 and at the other end thereof with an engaging piece 24 and having its top surface near the weight 23 tapered.

The joint member 22 is fitted in the axial groove 21 in the boss 15 of each circular saw 3. Then the spindle 1 is inserted into the boss 15.

While the spindle 1 is rotating at a low speed or is at a stop in this state, the inner periphery of the joint member 22 and the outer periphery of the spindle 1 extend in parallel to each other as shown in FIG. 11-I. Thus the circular saws 3 can be axially moved freely.

When the spindle 1 is rotated after the positioning of each saw 3, the circular saws 3 and the joint member 22 will rotate together with the spindle. The member 22 is tilted by the centrifugal force acting on the weight 23 as shown in FIG. 11-II, so that the tapered top portion near the engaging piece 24 is pressed against the spindle 1. Thus the circular saws 3 and the spindle 1 are coupled together.

In the sixth embodiment shown in FIGS. 12-I and 12-II, two joint members 22 of the same type as that of the fifth embodiment are provided which tilt in opposite directions to each other. They are the same in function as that of the fifth embodiment.

Namely, in the sixth embodiment, while the spindle 1 is at a stop or rotating at a low speed, the inner periphery of both the joint members 22 and the outer periphery of the spindle 1 are parallel to each other. Thus the circular saws 3 can be axially moved freely.

When the spindle 1 is rotated at a high speed after positioning the circular saws 3, the circular saws 3 and both the joint members 22 rotate together with the spindle. Also both joint members 22 are inclined as shown in FIG. 12-II by the action of the centrifugal force acting on the weights 23, so as to be pressed at their tapered top surface against the bottom surface of the ring-shaped members 16 and 17 and at their bottom surface against the outer periphery of the spindle 1. Thus the circular saws 3 and the spindle 1 are coupled together.

In the seventh embodiment shown in FIGS. 13-I and 13-II, a pair of joint members 22 like those of the sixth embodiment have their inner ends pivotally coupled together by means of a pin 35. In this case, the engaging pieces 24 as shown in FIG. 12 are not necessary.

In the seventh embodiment, as in the sixth embodiment, while the spindle 1 is rotating at a low speed or is at a stop, the inner periphery of the joint members 22 and the outer periphery of the spindle 1 are parallel to each other. Thus the circular saws 3 can be axially moved freely, When the spindle 1 is rotated at a high speed after positioning the circular saws 3, the circular saws 3 and the joint members 22 are rotated together with the spindle. The members 22 are tilted about the pin 35 as shown in FIG. 13-II by the action of centrifugal force acting on the weights 23, so as to be pressed at their top surface against the bottom surface of the ring-shaped members 16 and 17 and at their bottom surface against the outer periphery of the spindle 1. Thus the circular saws 3 and the spindle 1 are coupled together.

In the seventh embodiment, each pair of joint members 22 can be kept parallel to the spindle 1 by means of the pin 35.

FIGS. 14 and 15 show the eighth embodiment in which a one-way clutch A is mounted on the inner periphery of each circular saw 3.

The one-way clutch shown in the figures comprises a ring 30 provided with a plurality of circumferentially tapered 31, balls 32 received in the respective recesses 31, and springs 33 for biasing the balls 32 in the loosening direction.

While the spindle 1 is rotating at a low speed or at a stop and the balls 32 are in the larger cross-sectional portions of the recesses 31, each circular saw 3 is free to move on the spindle 1.

The position of circular saws 3 are adjusted in this state. Then by turning the spindle 1 at a high speed in the direction of arrow in FIG. 15, the circular saws 3 will be brought into locking engagement with the spindle 1 by the clutches A.

Any desired type of clutch other than the one shown, such as a polygonal one, may be used as the one-way clutch.

FIGS. 16 and 17 show the ninth embodiment in which an axially elongated arcuate movable joint member 38 is fitted on the outside of the spindle 1. This member 38 and the spindle 1 are coupled together so as to rotate in unison by means of a slide key 41 loosely received in a key groove 39 formed in the spindle 1 and a groove 40 formed in the inner periphery of the member 38, so that an inner peripheral surface 42 of the boss 4 of each circular saw 3 can freely move along the outer periphery of the joint member 38.

In the ninth embodiment, while the spindle 1 is rotating at a low speed or is at a stop, as shown in FIG. 16, a gap is formed between the outer periphery of the member 38 and the inner periphery 42 of the circular saws 3. Thus the circular saws 3 can freely move along the outer periphery of the members 38.

When the spindle 1 is rotated at a high speed after positioning the circular saws 3, the joint member 38 rotates together with the spindle. The member 38 moves outwardly by the action of a centrifugal force pressing its outer periphery against the inner periphery 42 of the boss 4 of each circular saw 3. Thus the circular saws 3 and the spindle 1 are coupled together through the member 38 so that the circular saws 3 can rotate together with the spindle 1.

In the ninth embodiment, if a single movable joint member 38 is provided at one side as shown in FIG. 16, it is necessary to provide a balance weight (not shown) at the other side. If there are provided two or more members 38, the balance weight can be omitted by providing the members 38 symmetrically or at angularly equal intervals.

In the tenth embodiment shown in FIGS. 18 and 19, the spindle 1 is provided in its outer periphery with threaded holes arranged at suitable intervals. A threaded sheath 48 is screwed into each threaded hole and fixed in position. A ball-shaped joint member 49 is fitted in each threaded sheath 48 so as to be freely movable. Then the outer ends of the threaded sheaths 48 are bent inwards by swaging or the like to prevent the members 49 from slipping out of the sheaths but to allow part of the members 49 to protrude from the outer periphery of the spindle 1.

Also, as in the other embodiments, keys 41 mounted on the spindle 1 are slidably received in key grooves 47 formed inside the bosses 4.

In the tenth embodiment, while the spindle 1 is rotating at a low speed or is at a stop, the members 49 are not pressed against the inner periphery 50 of the bosses 4. Thus the circular saws 3 are freely movable.

When the spindle 1 begins to rotate at a high speed, the members 49 are pressed against the inner peripheral surface 50 of each boss 4 by the action of a centrifugal force. Thus the circular saws 3 are coupled to the spindle 1.

In the tenth embodiment, as is apparent from FIG. 19, the adjustment of position is possible within the range in which the members 49 touch the inner peripheral surface 50 of each boss 4.

The eleventh embodiment shown in FIG. 20 is the same as the tenth ebmodiment except that a coil spring 51 is fitted in each of the threaded sheaths 48 of the tenth embodiment so that the members 49 do not move inwardly excessively. Therefore, there is shown only the portion which differs from the tenth embodiment.

In this embodiment, as in the tenth embodiment, while the spindle 1 is rotating at a low speed or is at a stop, the members 49 are in abutment with the springs 51 as shown by solid line. In this state, the position of the circular saws 3 is adjusted.

When the spindle 1 is rotated thereafter, the members 49 will protrude by the action of a centrifugal force as shown by dotted line so as to be pressed against the inner peripheral surface 50. Thus the spindle 1 and the circular saws 3 are coupled together.

In the twelfth embodiment shown in FIGS. 21 and 22, liquid is used.

In this embodiment, a plurality of hollow annular bodies 57 each comprising an annular member 55 having a cross-sectional shape of an outwardly opening U and a lid 56 made of a rigid material and fixed to the outer periphery of the annular member 55 are mounted on the outer periphery of the spindle 1 through keys 65 so as to be slidable and to rotate together with the spindle 1. A circular saw 3 is fixedly mounted on the outer periphery of each lid 56.

Each annular member 55 has an elastically deformable inner peripheral wall 58 integrally formed at suitable locations thereof with a plurality of guide sheaths 59 protruding into the annular body 57. A movable member 60 is slidably mounted in each guide sheath 59. Flanges 61 and 62 are formed at both ends thereof to prevent them from coming out of the sheaths.

In the inner peripheral walls 58 are formed recesses 63 in which the flanges 62 are received. An O ring 64 is fitted on the inner periphery of each guide sheath 59 for liquid-tightness. The hollow annular bodies 57 are filled with a liquid such as hydraulic oil.

In the twelfth embodiment, while the spindle 1 is rotating at a low speed or is at a stop, the inner periphery of each inner peripheral wall 58 is kept apart from the outer periphery of the spindle 1.

Thus the distances between the adjacent circular saws 3 can be adjusted freely.

When the spindle 1 is rotated at a high speed after adjusting the distances between the adjacent circular saws 3, the movable members 60 are moved outwardly by the action of a centrifugal force so as to protrude into the hollow annular bodies 57, thus increasing the fluid pressure in the annular bodies 57. Since the lids 56 are made of a rigid material and the inner peripheral walls 58 are elastically deformable, the fluid pressure will act on the inner surface of the inner peripheral walls 58 as shown by arrows in FIG. 21.

This will cause the inner peripheral walls 58 to be elastically deformed, pushing them toward the spindle 1 to press them against the outer peripheral surface of the spindle 1. Thus the circular saws 3 and the spindle 1 are coupled together.

What is claimed is:

1. A sawing machine comprising:
   a spindle;
   a plurality of saws on said spindle; a mounting member fixedly mounted on said spindle and engaging said plurality of saws and said spindle for mounting said circular saws on said spindle without relative rotation between the circular saws and said spindle and for transmitting rotation torque from said spindle to said circular saws, and for allowing said circular saws to be movable in an axial direction along said spindle; and
   a joint member which is other than said mounting member and mounted loosely between said spindle and said circular saws so as to be movable independently of said saws and with a radial component of motion relative to said saws due to centrifugal force produced by rotation of said spindle and saws between a locking position in engagement between the saw and the spindle where said circular saws are coupled to said spindle through said joint member so as not to be axially movable and an unlocking position where said circular saws and said spindle are not coupled together so that said circular saws can move axially, said joint member being movable to said locking position by centrifugal force when said spindle rotates at high speed and movable to said unlocking position when said centrifugal force disappears.

2. A sawing machine as claimed in claim 1, wherein said spindle has an axial groove in the outer periphery and said saws have grooves in the inner periphery, said joint member being mounted between said axial groove and said grooves in said saws, said joint member being pivotable in the direction of rotation of said spindle toward said locking position when the centrifugal force due to the rotation of said spindle acts thereon and pivotable in a direction opposite to the direction of rotation of said spindle toward said unlocking position when the centrifugal force disappears.

3. A sawing machine comprising:
   a spindle having an axial groove in the outer periphery;

a plurality of circular saws mounted on said spindle so as to rotate together with said spindle and movable in an axial direction along said spindle and each having a groove in the inner periphery;

a plurality of joint members, one corresponding to each circular saw, and mounted loosely between said axial groove in said spindle and the respective grooves in said circular saws so as to be pivotable in the direction of rotation of said spindle toward a locking position when the centrifugal force due to the rotation of said spindle acts thereon for coupling said circular saws to said spindle through said joint members so said circular saws are not axially movable, and pivotable in a direction opposite to the direction of rotation of said spindle to an unlocking position when the centrifugal force disappears for causing said circular saws and said spindle to be not coupled together so that said circular saws can move axially, said joint members each being pivotable about a pivot point and having a center of gravity spaced from said pivot point toward an outer end thereof, each joint member being provided on the outer end with a weight, the combined center of gravity of said joint member and said weight being outwardly in an outer end direction from said first-mentioned center of gravity, thereby increasing the magnitude of the moment due to centrifugal force which acts on said joint member when said spindle rotates.

4. A sawing machine comprising:

a spindle having an axial groove in the outer periphery;

a plurality of circular saws mounted on said spindle so as to rotate together with said spindle and movable in an axial direction along said spindle and each having a groove in the inner periphery, a space defined by said axial groove in the outer periphery of said spindle and said groove formed in the inner periphery of each of said circular saws having a substantial rectangular section;

a plurality of joint members, one corresponding to each circular saw, and mounted loosely in said space defined between said axial groove in said spindle and the respective grooves in said circular saws, said joint members each having a protrusion on the outer periphery thereof opposite the inner periphery of each of the corresponding circular saws and a pivot point on the inner periphery thereof opposite the outer periphery of said spindle, said joint members each being pivotable about said pivot point in the direction of rotation of said spindle toward a locking position when the centrifugal force due to the rotation of said spindle acts thereon for causing the protrusion to be pressed against the inner periphery of the corresponding circular saws for locking said circular saws to said spindle through said joint members so said circular saws are not axially movable, and pivotable about said pivot point in a direction opposite to the direction of rotation of said spindle to an unlocking position when the centrifugal force disappears for causing said circular saws and said spindle to be not coupled together so that said circular saws can move axially, each said joint member having a center of gravity spaced from said pivot point toward an outer end thereof, said joint member being provided on the outer end with a weight, the combined center of gravity of said joint member and said weight being outwardly in an outer end direction from said first-mentioned center of gravity, thereby increasing the magnitude of the moment due to centrifugal force which acts on said joint member when said spindle rotates.

5. A sawing machine comprising:

a spindle having an axial groove in the outer periphery;

a plurality of circular saws mounted on said spindle so as to rotate together with said spindle and movable in an axial direction along said spindle and each having a groove in the inner periphery, a space defined by said axial groove in the outer periphery of said spindle and said groove formed in the inner periphery of each of said circular saws having a substantial rectangular section;

a plurality of joint members mounted loosely in said space defined between said axial groove in said spindle and the respective grooves in said circular saws, said joint members each having a protrusion on the outer periphery thereof opposite the inner periphery of each of the corresponding circular saws and a pivot point on the inner periphery thereof opposite the outer periphery of said spindle, said joint members each being pivotable about said pivot point in the direction of rotation of said spindle toward a locking position when the centrifugal force due to the rotation of said spindle acts thereon for causing the protrusion to be pressed against the inner periphery of the corresponding circular saws for locking said circular saws to said spindle through said joint members so said circular saws are not axially movable, and pivotable about said pivot point in a direction opposite to the direction of rotation of said spindle to an unlocking position when the centrifugal force disappears for causing said circular saws and said spindle to be not coupled together so that said circular saws can move axially; and a biasing means engaging said joint members for resisting the pivoting motion of said joint members about said pivot point toward said locking position.

6. A sawing machine comprising:

a spindle having an axial groove in the outer periphery;

a plurality of circular saws mounted on said spindle so as to rotate together with said spindle and movable in an axial direction along said spindle and each having a groove in the inner periphery, a space defined by said axial groove in the outer periphery of said spindle and said groove formed in the inner periphery of each of said circular saws having a substantial rectangular section;

a plurality of joint members, one corresponding to each circular saw, and mounted loosely in said space defined between said axial groove in said spindle and the respective grooves in said circular saws, said joint members each having a protrusion on the outer periphery thereof opposite the inner periphery of each of the corresponding circular saws and a pivot point on the inner periphery thereof opposite the outer periphery of said spindle, said joint members each being pivotable about said pivot point in the direction of rotation of said spindle toward a locking position when the centrifugal force due to the rotation of said spindle acts thereon for causing the protrusion to be pressed against the inner periphery of the corresponding circular saws for locking said circular saws to said spindle through said joint members so said circular saws are not axially movable, and pivotable about said pivot point in a direction opposite to the direction of rotation of said spindle to an unlocking position when the centrifugal force disappears for causing said circular saws and said spindle to be not coupled together so that said circular saws can move axially.

* * * * *